(12) United States Patent
Paxton et al.

(10) Patent No.: US 7,658,425 B2
(45) Date of Patent: Feb. 9, 2010

(54) CANTILEVERED SUPPORT FOR AUTOMOTIVE SEATS

(75) Inventors: John Paxton, Long Beach, CA (US); Sven Etzelsberger, Huntington Beach, CA (US); Kris Tomasson, Bluffton, SC (US)

(73) Assignee: Ford Global Technologies, LLC, Dearborn, MI (US)

( * ) Notice: Subject to any disclaimer, the term of this patent is extended or adjusted under 35 U.S.C. 154(b) by 11 days.

(21) Appl. No.: 11/972,977

(22) Filed: Jan. 11, 2008

(65) Prior Publication Data

US 2009/0179465 A1 Jul. 16, 2009

(51) Int. Cl.
B60N 2/12 (2006.01)

(52) U.S. Cl. ............... 296/24.34; 296/65.01; 296/65.09

(58) Field of Classification Search .............. 296/65.01, 296/64, 65.05, 65.09, 65.13, 65.16, 24.34; 297/301.1, 354.11, 216.15, 216.1, 452.39
See application file for complete search history.

(56) References Cited

U.S. PATENT DOCUMENTS

| | | | | |
|---|---|---|---|---|
| 4,500,130 | A * | 2/1985 | Harmand | 296/65.13 |
| 4,555,138 | A * | 11/1985 | Hughes | 297/344.13 |
| 4,565,344 | A * | 1/1986 | Iwami | 248/429 |
| 4,880,268 | A * | 11/1989 | Brambilla | 296/65.05 |
| 5,335,970 | A * | 8/1994 | Bryant et al. | 297/344.22 |
| 5,407,166 | A * | 4/1995 | Pilarski | 248/430 |
| 5,913,570 | A * | 6/1999 | Yoshida et al. | 297/378.14 |
| 6,053,529 | A * | 4/2000 | Frusti et al. | 280/735 |
| 6,106,066 | A * | 8/2000 | Moffa et al. | 297/332 |
| 6,394,525 | B1 * | 5/2002 | Seibold | 296/65.09 |
| 6,460,929 | B2 * | 10/2002 | Kamida | 297/344.1 |
| 6,530,622 | B1 * | 3/2003 | Ekern et al. | 297/284.4 |
| 6,916,057 | B2 * | 7/2005 | Teich | 296/65.08 |
| 7,104,580 | B2 * | 9/2006 | Clark et al. | 296/24.32 |
| 7,104,607 | B2 * | 9/2006 | Yasuda et al. | 297/354.1 |
| 7,300,107 | B2 * | 11/2007 | Kammerer | 297/336 |
| 7,438,354 | B2 * | 10/2008 | Moffa et al. | 297/14 |
| 2003/0155786 | A1 * | 8/2003 | Kim et al. | 296/24.1 |
| 2004/0061349 | A1 * | 4/2004 | Drew et al. | 296/65.09 |
| 2004/0251705 | A1 * | 12/2004 | Tame et al. | 296/65.09 |
| 2005/0046220 | A1 * | 3/2005 | Hernandez et al. | 296/65.13 |

(Continued)

FOREIGN PATENT DOCUMENTS

WO 03057524 A1 7/2003

*Primary Examiner*—Glenn Dayoan
*Assistant Examiner*—Gregory Blankenship
(74) *Attorney, Agent, or Firm*—Frank A. MacKenzie; Brooks Kushman P.C.

(57) ABSTRACT

An interior seat assembly for a motor vehicle is provided. The interior seat assembly includes a center console, a seat back, a seat bottom, and a cantilevered member. The center console extends in fore and aft directions of the vehicle. The center console includes a first console section coupled to a floor of the vehicle and having at least one seat track positioned therein. The center console further includes a second console section supported by the first console section for storing items. The seat back is positioned adjacent to the center console. The seat bottom is coupled to the seat back for coacting with the seat back to support a passenger thereon. The cantilevered member is coupled to the seat track of the first console section and to the seat back for moving the seat back and the seat bottom in the fore or the aft directions of the vehicle.

19 Claims, 2 Drawing Sheets

U.S. PATENT DOCUMENTS

2005/0200151 A1* 9/2005 Welch et al. ............. 296/65.09
2005/0269830 A1* 12/2005 Epaud ..................... 296/65.09
2007/0132266 A1* 6/2007 Ghergheli et al. ........ 296/65.09

* cited by examiner

CANTILEVERED SUPPORT FOR AUTOMOTIVE SEATS

BACKGROUND

1. Technical Field

The embodiments of the present invention generally relate to seats for passenger vehicles.

2. Background Art

An interior of a vehicle generally includes a plurality of seats positioned throughout the vehicle for forming first, second and in some instances third row seating configurations. The seats in the first row are generally adapted to move on a plurality of seat tracks in fore and aft directions within the vehicle. In some cases, seats in the second and third rows are generally prohibited from moving in a linear direction. Often times, the seats in the second and third rows are adapted to collapse to facilitate ingress or egress for passengers attempting to access seats positioned within the third row seating arrangements. In some cases, the seats in the third row also collapse into a load floor of the vehicle to allow for additional storage to be placed in the vehicle.

The seats in the first, second and third rows are generally coupled to the load floor via a plurality of seat tracks. In some cases, the seats may each include a plurality legs (or stanchions) that are coupled directly to the load floor. The legs generally support a seat bottom of the seat assembly. The use of seat tracks or legs generally occupy valuable packaging space between the seat bottom and the load floor.

Center consoles also occupy valuable packaging space. The center consoles are generally coupled to the load floor and are positioned between a driver's seat and a passenger's seat. Vehicle occupants may store coins, CDs or other such items within the center console. Additionally, gear controls for transmission control may be packaged within the center console for driver manipulation.

SUMMARY

In one embodiment, an interior seat assembly for a motor vehicle is provided. The interior assembly includes a center console, a seat back, a seat bottom and a cantilever member. The center console extends in fore and aft directions of the vehicle. The center console includes a first console section coupled to a floor of the vehicle. The first console includes at least one seat track positioned therein. The center console further includes a second console section supported by the first console section for storing items. The seat back is positioned adjacent to the center console. The seat bottom is coupled to the seat back for coacting with the seat back to support a passenger thereon. The cantilevered member is coupled to the seat track of the first console section and to the seat back for moving the seat back and the seat bottom in at least one of the fore and the aft directions of the vehicle.

In another embodiment, the cantilevered member includes a console coupling member having a first end slideably coupled to the seat track and a second end extending away from the center console.

In yet another embodiment, the cantilevered member includes a seat support member coupled to the second end of the console coupling member which generally extends away from the floor of the vehicle to the seat bottom for supporting the seat bottom.

In yet another embodiment, the console coupling member and the seat support member are generally spaced from the floor of the vehicle such that the seat back and the seat bottom are slidable with respect to the seat track.

In yet another embodiment, the seat track of the first console section is generally spaced away from the floor of the vehicle.

In yet another embodiment, the console coupling member is generally spaced away from the floor of the vehicle.

In yet another embodiment, the seat support member is spaced in a generally parallel manner away from the center console.

In yet another embodiment, the seat back pivots in the aft direction and the seat bottom pivots in the fore direction for providing passenger ingress or egress to/from a seat orientated rearward of the seat back and the seat bottom.

In yet another embodiment, an angle between the seat back and the seat bottom is increased in response to providing passenger ingress or egress to/from the seat orientated rearward of the seat back and the seat bottom.

In yet another embodiment, the seat back is moved to a higher position within the vehicle to occupy headroom space in the vehicle in response to providing passenger ingress or egress to/from the seat orientated rearward of the seat back and the seat bottom.

In yet another embodiment, a headrest is provided which is coupled to the seat back and defines an opening therein that is visible to a passenger.

In another embodiment, an interior seat assembly for a motor vehicle which includes a center console coupled to a floor of the vehicle and extending in fore and aft directions of the vehicle and having at least one seat track positioned therein is provided. The seat assembly includes a seat back, a seat bottom, and a cantilevered member. The seat bottom is positioned adjacent to the center console and coupled to the seat back. The seat back and the seat bottom coact with each other to support a passenger thereon. The cantilevered member is coupled to the center console and the seat bottom. The cantilevered member includes a console coupling member. The console coupling member includes a first end slideably coupled to the seat track of the center console and a second end extending away from the center console. The cantilevered member further includes a seat support member coupled to the second end of the console coupling member. The cantilevered member generally extends away from the floor of the vehicle to the seat bottom for supporting the seat bottom. The console coupling member and the seat support member are generally spaced from the floor of the vehicle to facilitate sliding the seat back and the set bottom with respect to the seat track in at least one of the fore and aft directions of the vehicle.

In yet another embodiment, the console coupling member is generally spaced away from the floor of the vehicle.

In yet another embodiment, the seat support member is spaced in a generally parallel manner away from the center console.

In yet another embodiment, the seat back pivots in the aft direction and the seat bottom pivots in the fore direction for providing passenger ingress and egress to/from a seat orientated rearward of the seat back and the seat bottom.

In yet another embodiment, an angle between the seat back and the seat bottom is increased in response to providing passenger ingress or egress to/from the seat orientated rearward of the seat back and the seat bottom.

In yet another embodiment, a headrest is provided that is coupled to the seat back. The head rest defines an opening therein that is visible to a passenger.

In one embodiment, an interior seat assembly for a motor vehicle comprises a seat back. A seat bottom is pivotally coupled to the seat back for coating with the seat back to support a passenger thereon. At least one seat track is coupled to the seat bottom and at least one of a load floor and a center console of the vehicle and for providing slidable movement of the seat back and the seat bottom in the fore and aft directions of the vehicle. The seat back pivots about a first pivot point toward a rear of the vehicle and the seat bottom pivots about a second pivot point toward the front of the vehicle for providing passenger ingress or egress to/from a seat orientated rearward of the seat back and the seat bottom.

In yet another embodiment, an angle between the seat back and the seat bottom is increased in response to providing passenger ingress or egress to/from the seat orientated rearward of the seat back and the seat bottom.

In yet another embodiment, the seat back is moved to a higher position within the vehicle to occupy headroom space in the vehicle in response to providing passenger ingress or egress to/from the seat orientated rearward of the seat back and the seat bottom.

DETAILED DESCRIPTION OF THE PREFERRED EMBODIMENT(S)

Figure 1:
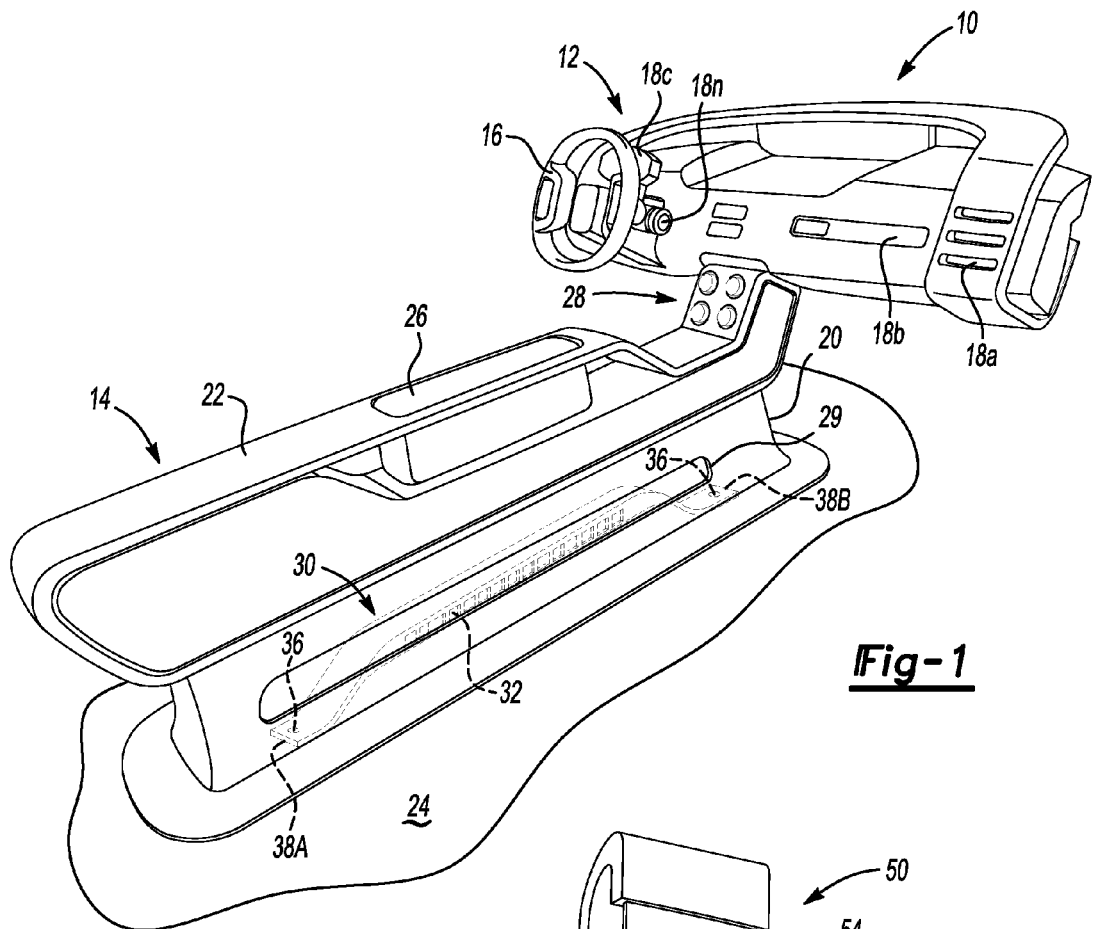
FIG. 1 is a perspective view of a vehicle interior in accordance to one embodiment of the present invention.

Referring now to FIG. 1, a vehicle interior 10 for a motor vehicle is illustrated in accordance to various embodiments of the present invention. The vehicle interior 10 includes an instrument panel 12 and a center console 14. The instrument panel 12 includes a steering wheel 16 and other such components (18a-18n) generally known to drivers and passengers. The components 18a-18n include air vents 18a, a glove box 18b, a display 18c, a key ignition switch 18n, etc.

The center console 14 generally extends in fore and aft directions in the vehicle. The center console 14 includes a first console section 20 and a second console section 22. The first console section 20 is coupled to a load floor 24. The first console section 20 supports the second console section 22. The first console section 20 and the second console section 22 may comprise two distinct components. Additionally, the first console section 20 and the second console section 22 may be integrated with each other to form a single component. The second console section 22 includes one or more storage bins 26 for storing compact discs, loose change or other suitable items. Gauges/vents 28 or other such mechanisms may be positioned on the second console section 22.

The first console section 20 includes one or more brackets 29 having at least one seat track 30. The bracket 29 and seat track 30 extend between the fore and aft directions. The seat track 30 slideably receives one or more seat assemblies to facilitate linear movement of the seat in the fore and aft directions of the vehicle. A rack and pinion interface may be used to couple a seat assembly to the seat track 30. The seat assemblies will be discussed in more detail in connection with FIGS. 2-3. For example, the seat tracks 30 may be implemented as a vertically grooved rack 32 for receiving a geared wheel within the seat assembly. The rack 32 and the geared wheel coact with each other to facilitate fore/aft movement of the seat assemblies.

The grooves of the rack 32 may face towards the side of the vehicle (e.g., towards the driver or passenger door of the vehicle). Other such embodiments may include the seat track 30 being configured such that the grooves of the rack 32 face towards the top of the vehicle (e.g., the ceiling of the vehicle) so that the grooves receive the geared wheel in a perpendicular manner with respect to the load floor of the vehicle. With such a configuration, the seat track 30 may include a boss or other such reinforced projection positioned proximate to the rack 32 to provide additional support for the seat assembly. A plurality of fastening devices 36 couples the bracket 29 to the load floor 24. The seat track 30 is generally positioned away from the floor of the vehicle with exception of mounting flanges 38a-38n which receives the fastening devices 36. While FIG. 1 depicts a single bracket 29 and seat track 30, additional brackets and seat track may be parallely positioned opposite to the bracket 29 and seat track 30 on the other side of the center console so that driver and passenger seat assemblies may be moved in the fore and aft directions of the vehicle.

Figure 2:
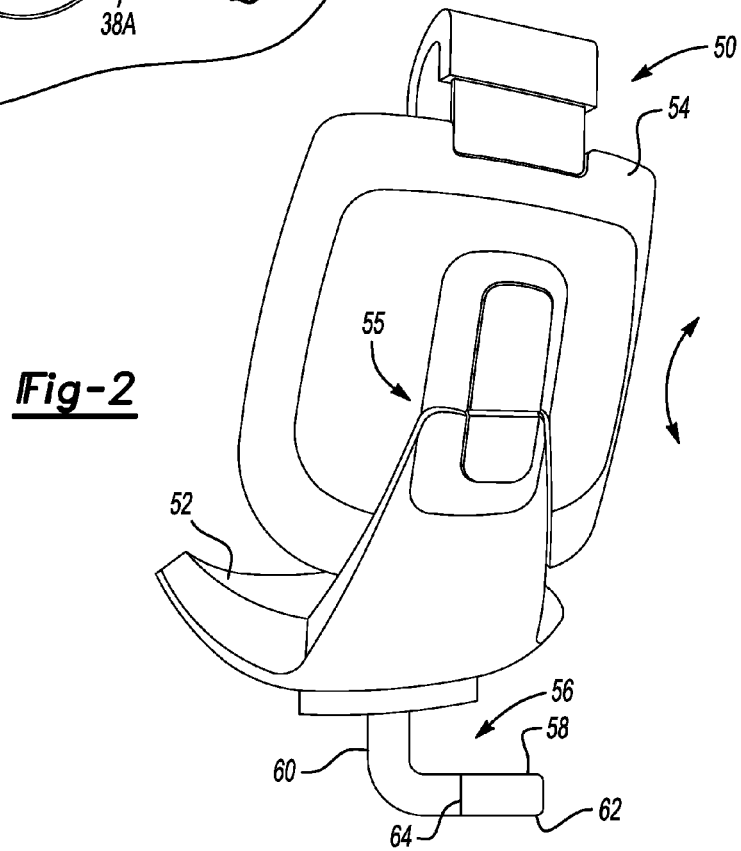
FIG. 2 is a perspective view of vehicle seat assemblies for use with the vehicle interior of FIG. 1.

Referring now to FIG. 2, a vehicle seat assembly 50 for use in connection with the vehicle interior 10 is shown. The vehicle seat assembly 50 includes a seat bottom 52 and a seat back 54. The seat bottom 52 and the seat back 54 coact with each other to support a passenger in the vehicle. In one example, the seat bottom 52 and the seat back 54 may be pivotally coupled to each other about a pivot axis 55. In general, the seat back 54 is configured to pivot rearward (e.g., in the vehicle) about the pivot axis 55 while the seat bottom 52 pivots forward (e.g., in the vehicle). Such a condition will be discussed in more detail in connection with FIG. 3.

The vehicle seat assembly 50 includes a cantilevered member 56. The cantilevered member 56 couples the seat bottom 52 and the seat back 54 to the seat track 30 in the center console 14. The cantilevered member 56 includes a console coupling member 58 and a seat support member 60. The console coupling member 58 and the seat support member 60 may be shaped to form a single member made of steel or other suitable metal. Alternatively, the console coupling member 58 and the seat support member 60 may be separate members coupled together to form the cantilevered member 56.

The console coupling member 58 includes a first end 62 and a second end 64. The first end may include the geared wheel as noted above which intermeshes with the grooves of the rack 32. The second end 64 is extended away from the center console 14. The seat support member 60 includes an end coupled to the second end 64 of the console coupling member 58 and at another end coupled to the seat bottom 52. The seat support member 60 is generally L-shaped or defines an angle that is less than or equal to ninety degrees.

Figure 3:
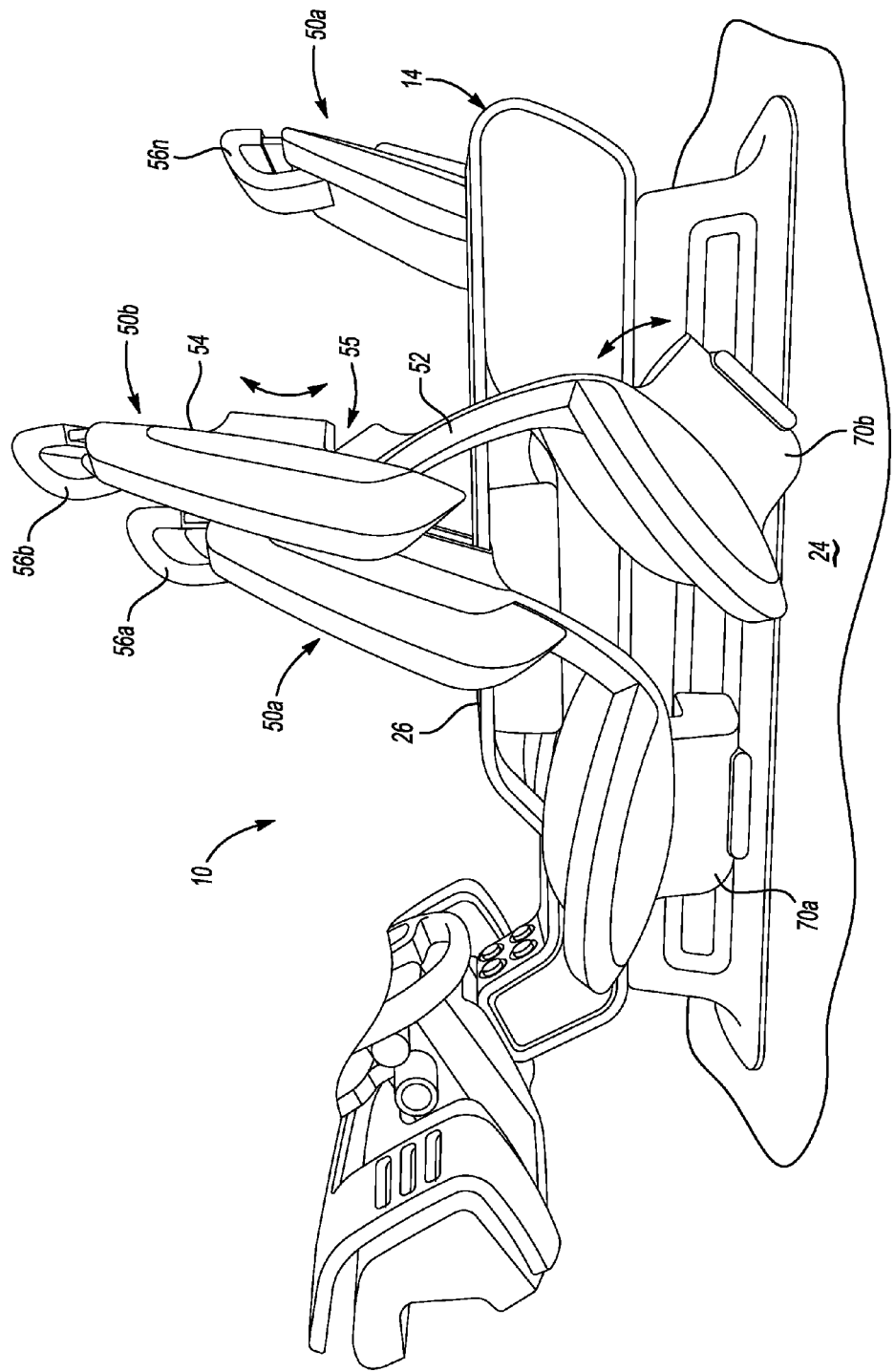
FIG. 3 is a side view of the vehicle interior which illustrates vehicle seat assemblies coupled to a center console.

Referring now to FIG. 3, a side view of the vehicle interior 10 coupled to the vehicle seat assembly 50 of FIG. 2 is shown. A plurality of seat assemblies 50a-50n are coupled to the center console 14. The center console 14 is configured to extend between first and second rows. The center console 14 may also be adapted to extend back to a third row. The length of the center console 14 may vary based on the desired criteria of a particular application. In the event the center console 14 extends back to the third row, the seat assemblies within the third row may be coupled to the center console 14 via the cantilevered member 56. The seat assemblies 50a-50n may move at distances in the fore and aft directions that are different from one another. Mechanical stops may be positioned about the seat track 30 to limit the distance traveled for each seat assemblies 50a-50n. The seat assemblies 50a and 50b may be coupled to a single seat track 30, or each may be coupled to a dedicated seat track 30.

A housing 70a-70n may cover the cantilevered member 56 for each seating assembly 50a-50n. Each seat back for each seat assembly 50a-50n is coupled to a headrest 56a-56n. Each headrest 56a-56n is generally U-shaped and define an opening that is visible to occupants in the vehicle. The cantilevered member 56 is generally spaced away from the floor 74 of the vehicle to allow for seat travel. Passengers of the vehicle may move the seat assemblies 50a-50n through the use of a lever and spring mechanism generally known by those skilled in the art. Alternatively, stepper motors, servo motors, or other suitable linear drive devices may be used to drive the seats. The stepper motors are responsive to high current to linearly drive the seat assemblies 50a-50n. Controllers may be employed with a low-current switching device to drive the seat assemblies 50a-50n and provide automated memory seat position.

The controller may have a microprocessor and memory for storing occupant seat positions for the seat assemblies 50a-50n with respect to the seat tracks. The low current switches may be positioned proximate to each seat assemblies 50a-50n. Switches which correspond to pre-saved seat locations about the seat track may also be positioned proximate to each seat assembly 50a-50n. Each seat assembly 50a-50n may include a harmonic gear drive for causing a corresponding seat assembly 50a-50n to tamber. With the tamber operation, the seat bottom 52 pivots forward about a pivot point positioned about the cantilevered member 56 and/or the seat track 30 as the seat back 54 pivots rearward thereby increasing the angle between the seat back 54 and the seat bottom 52. The pivoting characteristic between the seat bottom 52 and the seat back 54 allows the seat back 54 to occupy open head space above the seat assembly 50b. Prior art pivoting configurations generally pivot the seat back in a forward direction thereby decreasing the angle between the seat back and the seat bottom. The pivoting characteristic of the seat assemblies 50a-50n may provide for increased ingress and egress clearances over prior art configurations since the seat back 54 occupies the area above the head rest due to the rearward pivot which is an area that is seldom occupied. With prior art systems, particularly with seats in the second and third rows, the seat back may pivot forward and collapse on the seat bottom, but the seat bottom may not be adapted to move forward or collapse into the load floor. The pivoting configurations related to the seating assemblies 50a-50n may be implemented on vehicles that utilize one or more seat tracks positioned on the load floor of the vehicle or seat tracks positioned within the center console. A servo motor or stepper motor may be used with a suitable transmission such as a harmonic gear drive generally known to one skilled in the art to cause the pivoting action of the seat back and the seat bottom.

In general, by coupling the seat assemblies to the seat tracks positioned within the center console with the cantilevered members, packaging space beneath the seat assemblies may become available to passengers of the vehicle for increased storage capability so long as such storage does not impede movement of the seats when driven longitudinally. In addition, the cantilevered coupling characteristic may minimize the number of seat tracks or legs (or stanchions) needed to couple the seat assemblies to the load floor of the vehicle. Further, the rearward pivoting characteristic of the seat back and the forward pivoting characteristic of the seat bottom increase the angle therebetween which may increase ingress and egress clearances within the vehicle.

While embodiments of the present invention have been illustrated and described, it is not intended that these embodiments illustrate and describe all possible forms of the invention. Rather, the words used in the specification are words of description rather than limitation, and it is understood that various changes may be made without departing from the spirit and scope of the invention.

What is claimed is:

1. An interior seat assembly for a motor vehicle comprising:
    a center console extending in fore and aft directions of the vehicle, wherein the center console includes a first console section coupled to a floor of the vehicle and having at least one seat track positioned therein and a second console section supported by the first console section for storing items;
    a seat back positioned adjacent to the center console;
    a seat bottom coupled to the seat back for coacting with the seat back to support a passenger thereon; and
    a cantilevered member coupled to the seat track of the first console section and to the seat bottom for moving the seat back and the seat bottom in at least one of the fore and the aft directions of the vehicle,
    wherein the seat back pivots in the aft direction and the seat bottom pivots in the fore direction for providing passenger ingress or egress to/from a seat orientated rearward of the seat back and the seat bottom.

2. The interior seat assembly of claim 1 wherein the cantilevered member includes a console coupling member having a first end slideably coupled to the seat track and a second end extending away from the center console.

3. The interior seat assembly of claim 2 wherein the cantilevered member includes a seat support member coupled to the second end of the console coupling member which generally extends away from the floor of the vehicle to the seat bottom for supporting the seat bottom.

4. The interior seat assembly of claim 3 wherein the console coupling member and the seat support member are generally spaced from the floor of the vehicle such that the seat back and the seat bottom are slidable with respect to the seat track.

5. The interior seat assembly of claim 1 wherein the seat track of the first console section is generally spaced away from the floor of the vehicle.

6. The interior seat assembly of claim 2 wherein the console coupling member is generally spaced away from the floor of the vehicle.

7. The interior seat assembly of claim 3 wherein the seat support member is spaced in a generally parallel manner away from the center console.

8. The interior seat assembly of claim 1 wherein an angle between the seat back and the seat bottom is increased for providing passenger ingress or egress to/from the seat orientated rearward of the seat back and the seat bottom.

9. The interior seat assembly of claim 1 wherein the seat back is moved to a higher position within the vehicle to occupy headroom space in the vehicle for providing passenger ingress or egress to/from a seat orientated rearward of the seat back and the seat bottom.

10. The interior seat assembly of claim 1 including a headrest coupled to the seat back defining an opening therein that is visible to a passenger.

11. An interior seat assembly for a motor vehicle which includes a center console coupled to a floor of the vehicle and extending in fore and aft directions of the vehicle and having at least one seat track positioned therein, the seat assembly comprising:
    a seat back;
    a seat bottom positioned adjacent to the center console and coupled to the seat back, wherein the seat back and the seat bottom coact with each other to support a passenger thereon; and a cantilevered member coupled to the center console and the seat bottom, wherein the cantilevered member includes:
  a console coupling member having a first end slideably coupled to the seat track of the center console and a second end extending away from the center console; and
  a seat support member coupled to the second end of the console coupling member and generally extending away from the floor of the vehicle to the seat bottom for supporting the seat bottom,
wherein the console coupling member and the seat support member are generally spaced from the floor of the vehicle to facilitate sliding the seat back and the seat bottom with respect to the seat track in at least one of the fore and aft directions of the vehicle, and
wherein the seat back pivots in the aft direction and the seat bottom pivots in the fore direction for providing passenger ingress or egress to/from a seat orientated rearward of the seat back and the seat bottom.

12. The interior seat assembly of claim 11 wherein the console coupling member is generally spaced away from the floor of the vehicle.

13. The interior seat assembly of claim 11 wherein the seat support member is spaced in a generally parallel manner away from the center console.

14. The interior seat assembly of claim 11 wherein the seat back is moved to a higher position within the vehicle to occupy headroom space in the vehicle for providing passenger ingress or egress to/from the seat orientated rearward of the seat back and the seat bottom.

15. The interior seat assembly of claim 11 further including a headrest coupled to the seat back that defines an opening therein that is visible to a passenger.

16. An interior seat assembly for a motor vehicle comprising:
  a seat back;
  a seat bottom pivotally coupled to the seat back for coacting with the seat back to support a passenger thereon; and
  at least one seat track coupled to the seat bottom and at least one of a load floor and a center console of the vehicle and for providing slidable movement of the seat back and the seat bottom in the fore and aft directions of the vehicle,
wherein the seat back pivots about a first pivot point toward a rear of the vehicle and the seat bottom pivots about a second pivot point toward the front of the vehicle for providing passenger ingress or egress to/from a seat orientated rearward of the seat back and the seat bottom.

17. The interior seat assembly of claim 16 wherein an angle between the seat back and the seat bottom is increased for providing passenger ingress or egress to/from the seat orientated rearward of the seat back and the seat bottom.

18. The interior seat assembly of the claim 16 wherein the seat back is moved to a higher position within the vehicle to occupy headroom space in the vehicle for providing passenger ingress or egress to/from the seat orientated rearward of the seat back and the seat bottom.

19. An interior seat assembly for a motor vehicle comprising:
  a center console extending in fore and aft directions of the vehicle, wherein the center console includes a first console section coupled to a floor of the vehicle and having at least one seat track positioned therein and a second console section supported by the first console section for storing items;
  a seat back positioned adjacent to the center console;
  a seat bottom coupled to the seat back for coacting with the seat back to support a passenger thereon; and
  a cantilevered member coupled to the seat track of the first console section and to the seat bottom for moving the seat back and the seat bottom in one of the fore and the aft directions of the vehicle,
wherein the seat back and the seat bottom define a pivot angle such that the seat bottom pivots in a first direction and the seat back pivots in a second direction causing the pivot angle to increase and moving at least a portion of the seat back into a headroom space of the vehicle to provide passenger ingress or egress to/from a seat orientated adjacent to the seat back and the seat bottom.

* * * * *